United States Patent
Ito

(10) Patent No.: US 6,634,248 B2
(45) Date of Patent: Oct. 21, 2003

(54) SHIFT CONTROL APPARATUS AND METHOD FOR VEHICLE

(75) Inventor: Nobuyasu Ito, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/154,107

(22) Filed: May 22, 2002

(65) Prior Publication Data

US 2002/0174735 A1 Nov. 28, 2002

(30) Foreign Application Priority Data

May 23, 2001 (JP) ........................................ 2001-153257

(51) Int. Cl.[7] ........................ F16H 59/00; F16H 61/00
(52) U.S. Cl. ..................................................... 74/336 R
(58) Field of Search ........................................ 74/336 R

(56) References Cited

U.S. PATENT DOCUMENTS 5,036,718 A * 8/1991 Bulgrien ................... 74/336 R
5,089,965 A * 2/1992 Braun ....................... 74/336 R
5,916,291 A * 6/1999 McKee ...................... 74/336 R

* cited by examiner

*Primary Examiner*—Dirk Wright
(74) *Attorney, Agent, or Firm*—Morgan & Finnegan, LLP

(57) ABSTRACT

A vehicular shift control apparatus, including a drive mechanism, has first and second solenoids, first and second switches, a shift switch and a controller. The first and second solenoids control the drive mechanism in forward and reverse modes, respectively, and connect with the first and second switches, respectively, which supply the solenoids with a current when actuated. The shift switch selectively supplies the first and second switches with the current. The controller actuates and de-actuates the first and second switches based on the speed of the vehicle. The first and second switches can be actuated when the speed is lower than a predetermined value and a corresponding forward or reverse gear is selected when one of the first and second switches corresponding to the shift mode of the moving vehicle remains closed the other switch is open and cannot be closed except when the speed is below the predetermined value.

12 Claims, 3 Drawing Sheets

SHIFT CONTROL APPARATUS AND METHOD FOR VEHICLE

BACKGROUND OF THE INVENTION

The present invention relates to a shift control apparatus for a vehicle, which protects the driving mechanism of the vehicle and inhibits excessive loads from acting on a torque converter by preventing the shifting to an opposite direction gear when the speed of the vehicle exceeds a threshold value.

In a vehicle that includes a torque converter transmission, such as a forklift that requires a high net working rate and that is repeatedly frequently moved backward and forward, for example, a reverse (R) mode gear might be engaged before the vehicle stops. Thereby, a powerful engine braking force is exerted and the vehicle changes direction in a short time. The foregoing type of operation, however, gives rise to repeated loading and unloading forces on the drive transmission and can overload the torque converter. Therefore, solutions have been proposed for preventing reverse-direction gears from being engaged during times when the speed of the vehicle exceeds a predetermined value. FIG. 3 depicts one such solution.

In the apparatus of FIG. 3, a speed sensor 50 detects when the vehicle is stopped, i.e., when velocity=0. The signal from the speed sensor 50 is supplied to an electronic control unit ECU, which thereupon energizes two relays 51, 52. The contacts of the relays 51, 52 are supplied with battery current through the ignition switch 60 and contacts in the shift selector switch 53. Thus, as the shift selector switch 53 is shifted to a forward (F) position to move the vehicle forward, electric current flows through the F contacts of the switch 53 to a conductor 54. This current then flows through the energized (closed) contacts of the relay 51 to energize a first solenoid 55, which is assumed to permit or effect engagement of a forward gear. This same current also energizes the coil of the latching relay 56, which latches in the closed position as long as F is selected. Current thereby continues to be supplied to the solenoid 55 even after the vehicle is moving.

If the shift selector is later shifted into the reverse (R) position, the current path through the shift selector switch 53 to the conductor 54 is broken. Consequently, both the relay 56 and the solenoid 55 become de-energized, and the solenoid 55 can be re-energized only if the vehicle is brought to a stop, since only then are the relays 51 and 52 energized. Further, for the same reason, the reverse drive mode is not activated until the vehicle is brought to a stop. At that time, current is supplied through the energized contacts of the relay 52 to the solenoid 58 and coil of the latching relay 59. This keeps the solenoid 58 energized after the vehicle is in motion. In this manner, both F and R can be engaged when the vehicle is at rest; at other times, moving the shift selector from one position to the another position results in the de-energization of one of the drive solenoids 55 and 58.

From the foregoing, it will be understood that the relays 51 and 52 are controlled by a signal from the ECU in response to the vehicle speed. Accordingly, once the shift selector is moved from either the F or the R position, the latching relays 56, 59 become de-energized and the solenoids 55, 58 cannot be re-energized until the vehicle speed is again brought to zero (or some value below a threshold level). Thus, once the shift switch is shifted from one drive direction to another, the previous drive direction cannot be re-entered until the vehicle stops. This is disadvantageous because it limits the versatility of conditions under which the vehicle can be operated. For example, the vehicle operator cannot disengage the drive mechanism momentarily and then re-engage the drive mechanism in the same direction, since the FIG. 3 configuration does not allow that shifting sequence.

SUMMARY OF THE INVENTION

The present invention addresses the above-mentioned limitation and provides an improved shift control apparatus and method that prevents the shifting into a reverse-direction gear when the vehicle velocity exceeds a threshold value, but nevertheless allows the disengagement and re-engagement of the drive direction in the same direction even when the vehicle velocity exceeds the threshold value.

In preferred embodiments of the invention, the foregoing operation is attained by supplying current to the drive mechanism control solenoids from the shift selector through switches that are controlled to remain closed as long as either (1) the vehicle velocity remains below the threshold value or (2) if velocity is above the threshold value, the previously selected directional mode is re-selected. If the velocity exceeds the threshold value, the switch controlling the opposite direction solenoid is opened to prevent engagement of the drive mechanism in the opposite direction.

BRIEF DESCRIPTION OF THE DRAWINGS

The invention together with objects and advantages thereof, may best be understood by reference to the following description of the presently preferred embodiments together with the accompanying drawings, in which.

DETAILED DESCRIPTION OF THE PREFERRED EMBODIMENTS

Figure 1:
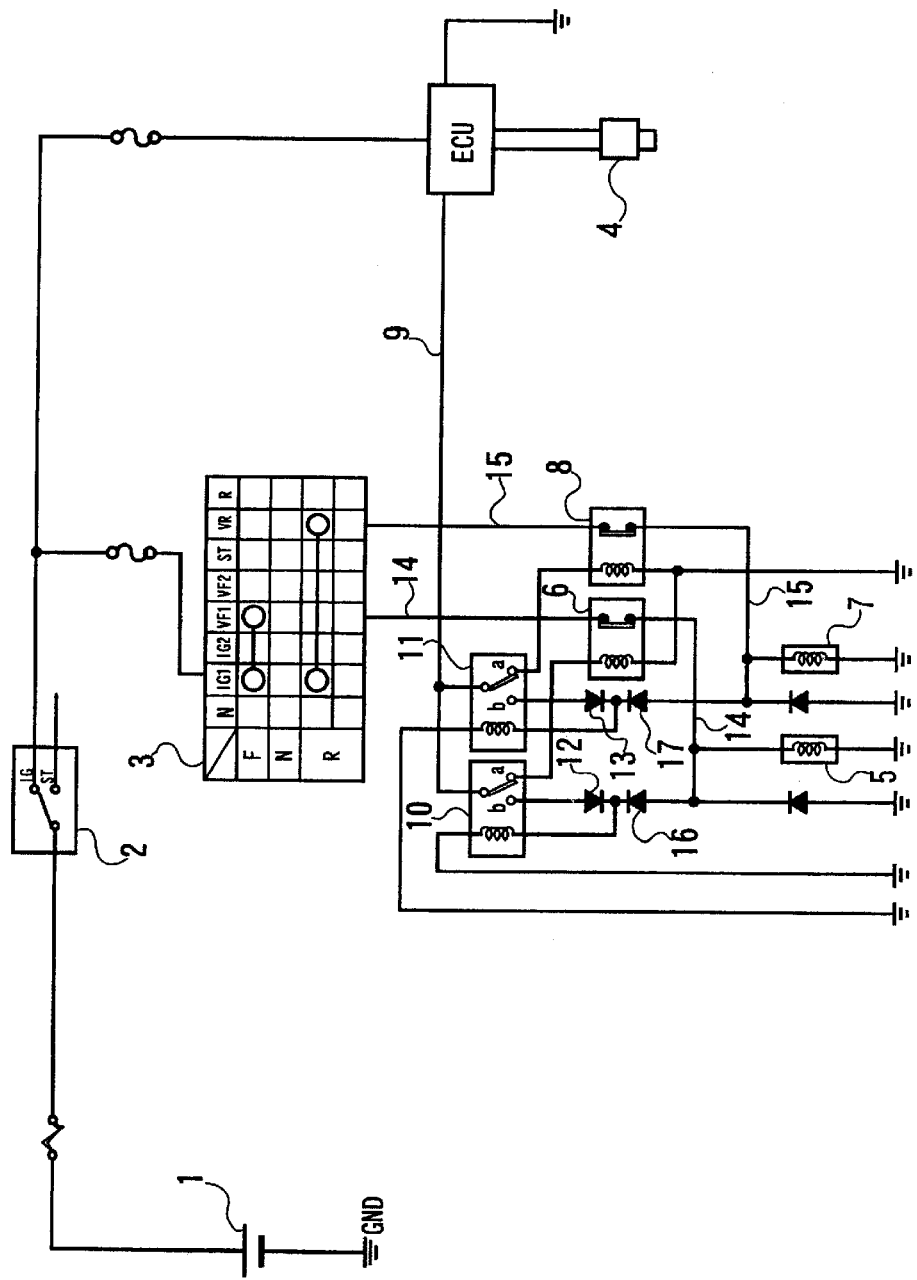
FIG. 1 is a circuit diagram according to a first embodiment of the present invention.

As shown in FIG. 1, the negative (minus) terminal of a battery 1 connects with a ground GND, and the positive (plus) terminal of the battery 1 connects with an ignition key switch 2. The ignition terminal IG of the key switch 2 connects with the terminal IG1 of a shift switch 3, and also connects with an electrical control unit ECU. The ECU receives the output signal of a speed sensor 4 representing information about the speed of the vehicle. In practice, the ECU generates a signal on the conductor 9 when the vehicle speed exceeds a threshold value. In the shift switch 3, the terminal IG1 and a terminal VF1 become interconnected upon positioning a shift lever in the forward position F, and the terminal IG1 and a terminal VR become interconnected upon positioning the shift lever in the reverse position R.

A first solenoid 5 for controlling a drive mechanism (not shown) allowing forward vehicle movement is energizable through connection with the terminal VF1 of the shift switch 3 via the conductor 14 and the normally closed contacts of a control relay 6. Similarly, a second solenoid 7 controls the drive mechanism for moving the vehicle in the reverse direction. It is energizable through connection with the terminal VR of the shift selector switch 3 via a conductor 15 and the normally closed contacts of a relay 8. When the ECU detects, by the signal from the speed sensor 4, that the vehicle speed is above a threshold value, the ECU supplies an energizing electric current on the conductor 9.

The conductor 9 is connected to the common terminal of each of a latching F relay 10 and a latching R relay 11, respectively. The normally closed contact terminals of the latching relays 10, 11 are connected to the coils of the respective control relays 6 and 8. Consequently, only when the relays 10 and 11 are de-energized, the control relays 6 and 8 become energized and open the circuit path to the drive solenoids 5, 7. On the other hand, if either the relay 10 or the relay 11 is energized, then the corresponding control relay will be de-energized and current can flow from the shift selector switch through the normally closed contacts of the control relays 6, 8 to a respective drive solenoid. Accordingly, with the latching relay 10 de-energized, moving the shift selector switch 3 to the F position at any time will result in the drive solenoid 5 becoming actuated. Likewise, with the latching relay 11 energized, moving the shift selector switch 3 to the R position at any time will cause the reverse drive solenoid 7 to become actuated.

Whenever current is supplied to the solenoid 5 by selecting a forward F gear, current also is supplied via the diode 16 to the coil of the latching relay 10 to interconnect the common contact terminal with the normally open contact terminal b. This conditions the relay 10 to be latched through the diode 12 by current placed on the conductor 9 by the ECU. Similarly, whenever current is supplied to the solenoid 7 by selecting a reverse R gear, current also is simultaneously sent via the diode 17 to the coil of the latching relay 11 to interconnect its common contact terminal with its normally open contact terminal b. This conditions the relay 11 to be latched through the diode 13 by current placed on the conductor 9 by the ECU. With this circuit, once the vehicle is driven to its threshold speed, the two latching relays 10, 11 will always be in opposite states of energization, thus preventing the vehicle from being shifted into a reverse direction at speeds exceeding the threshold speed.

The function of the present embodiment upon forward movement will now be described. As the shift switch 3 is shifted to the F position, the current through the shift switch 3 passes through the conductor 14 via the normally closed contacts of the control relay 6 and energizes the first drive solenoid 5, thus permitting forward movement of the vehicle. The electric current also flows through the diode 16, and actuates the F latching relay 10, interconnecting the conductor 9 with the normally open contact terminal b. As the speed of the vehicle increases and the value of the speed detected by the speed sensor 4 exceeds a predetermined threshold value, the ECU supplies the conductor 9 with current that latches the relay 10 in the energized state via the diode 12. Conversely, the current on the conductor 9 flows through the normally closed contacts of the R relay 11 and energizes the coil of the relay 8. The normally closed contacts of the relay 8 thereupon open. In this state, if the shift switch 3 is shifted to the R position, the second drive solenoid 7 is not actuated due to the opened state of the relay 8 contacts. Accordingly, shifting the gear into the reverse mode is prevented. Meanwhile, since the F latching relay 10 is latched "closed" due to the signal on the conductor 9, the control relay 6 contacts remain closed. Therefore, if the shift switch 3 is shifted out of the F position to a different (N or R) position and returned to the F position, the first control solenoid 5 is de-energized and then energized again.

Upon initial shifting of the vehicle into the R position, the sequence of events that occur with the first and second solenoids 5, 7, the relays 6, 8 and the F and R relays 10,11 only exchange their actuation states. The function is similar to those with a forward gear selection.

It should be apparent from the foregoing that the embodiment of FIG. 1 achieves certain advantages not obtained with the arrangements of the prior art. First, when the speed of the vehicle exceeds a certain threshold value (which can be either a fixed value or a variable rate computed by the ECU in accordance with instantaneous operating conditions), shifting the gear to a reverse direction mode relative to the moving direction of the vehicle is precluded. Importantly, however, even if the shift lever is shifted out of the initially selected direction gear to an opposite direction gear relative to the moving direction, or to a neutral position, the vehicle can be shifted again into the originally selected direction by returning the shift lever to the originally selected drive mode without regard to the speed of the vehicle. Thereby, both engine braking and acceleration can be recognized.

Figure 2:
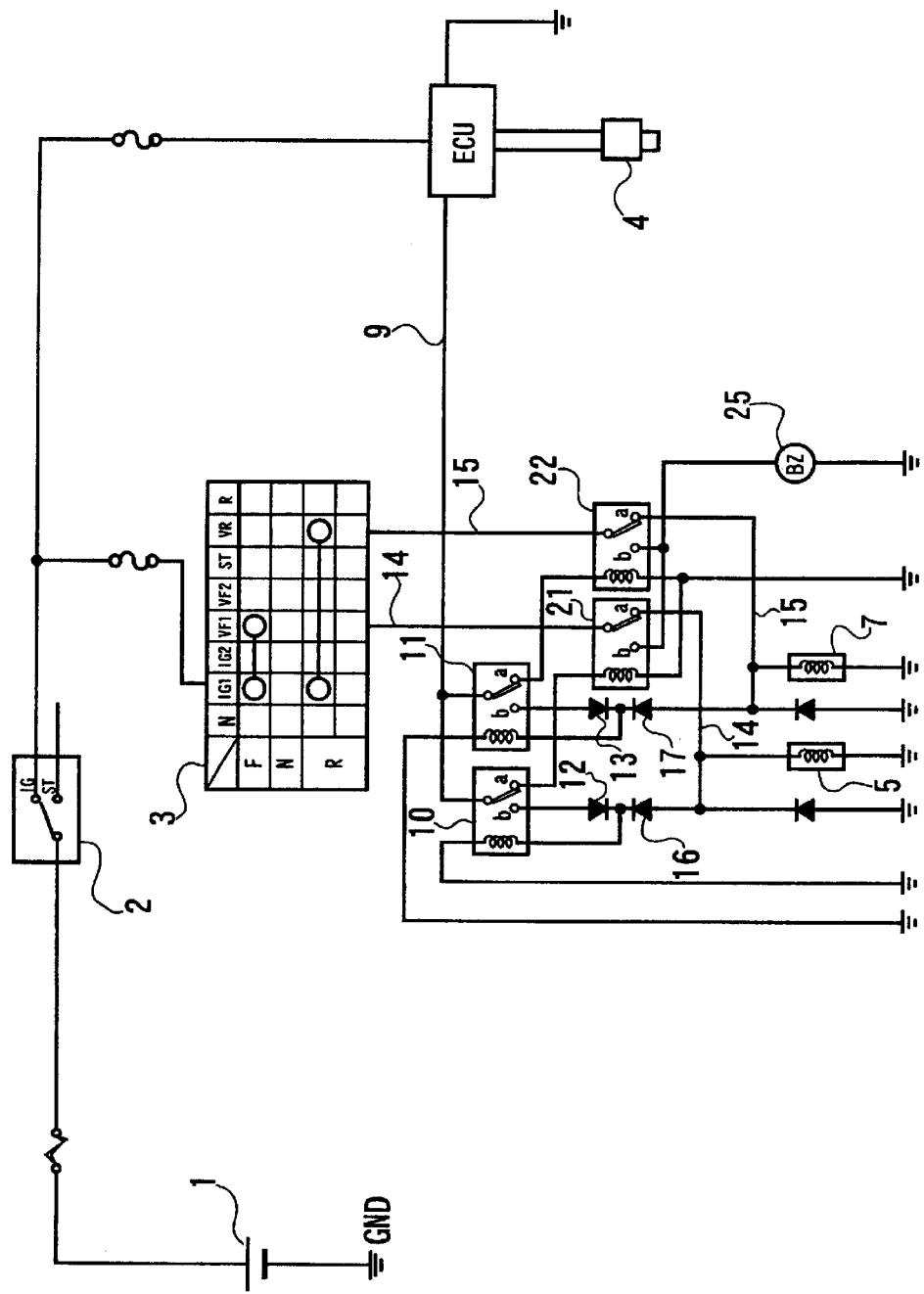
FIG. 2 is a circuit diagram according to a second embodiment of the present invention.
Figure 3:
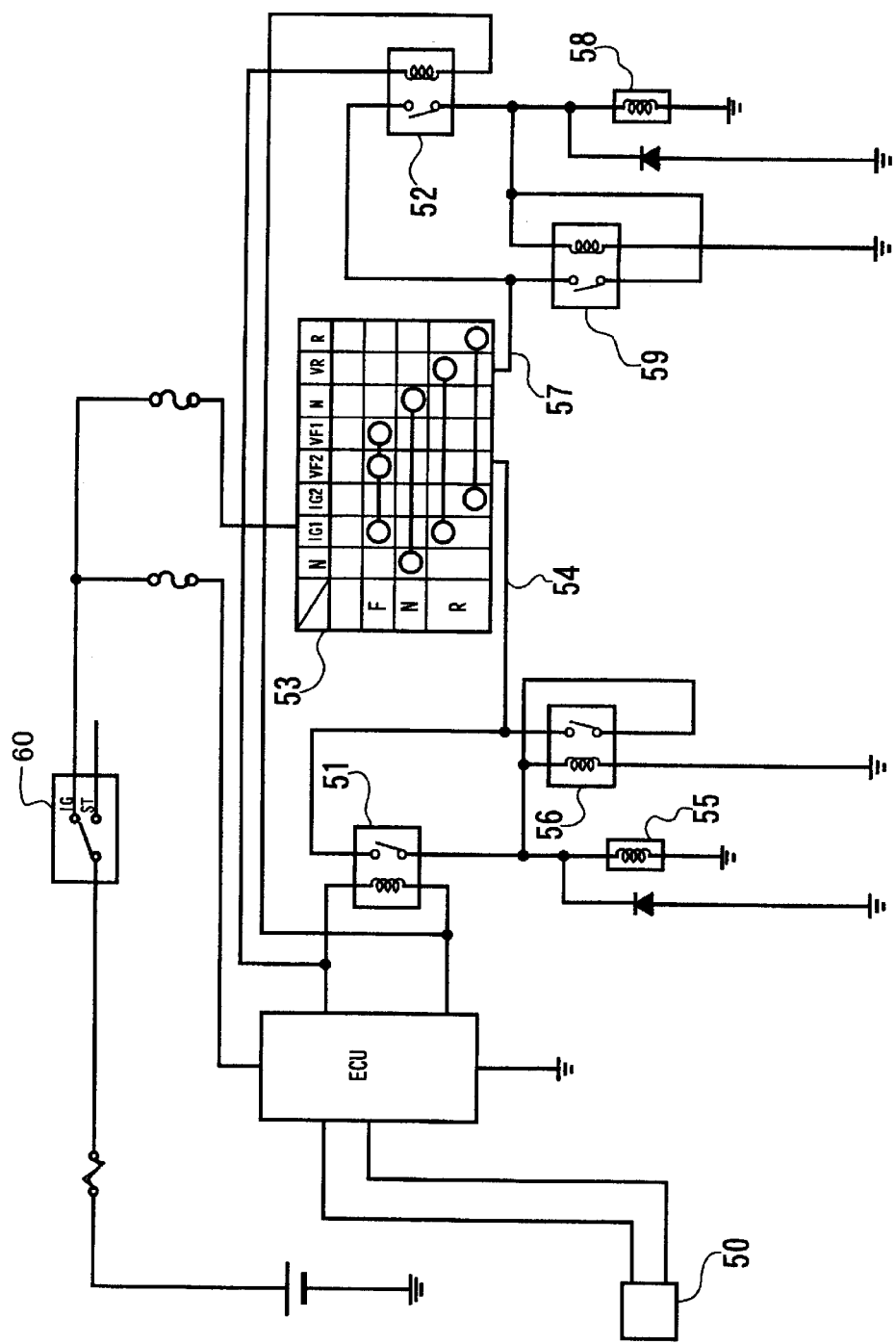
FIG. 3 is a circuit diagram of prior art apparatus.

A second embodiment of the present invention is shown in FIG. 2. In the second embodiment, when the shift lever is shifted to the position opposite to the moving direction during an operation of the shift control apparatus, the apparatus alarms an operator such as by a warning light or by beeping a buzzer.

In the embodiment of FIG. 2, the same reference numerals denote the same or similar components to those in the embodiment of FIG. 1. As illustrated, the two-pole relays 21, 22 are implemented in place of the single-pole relays 6,8. The common contact terminals of the relays 21, 22 are connected to the conductors 14, 15 respectively. Terminal a of the relay 21 connects with the first solenoid 5 and terminal a of the relay 22 connects with the second solenoid 7. Terminal b of the relays 21, 22 each connect with a warning means, a buzzer 25 in the present embodiment.

In operation of the embodiment of FIG. 2, as the switch shift is shifted to the F position, battery current is supplied through the ignition switch 2, the shift switch 3, the conductor 14, and terminal a of the relay 21 (assuming the vehicle speed is below the threshold), and energizes the first solenoid 5, thus permitting the forward movement. Current also flows through the diode 16, and actuates the latching F relay 10, connecting contact terminal b of that relay to the conductor 9. As the speed of the vehicle increases and the value of the speed detected by the speed sensor 4 exceeds a predetermined threshold value, the ECU supplies a current to the conductor 9. Electric current therefore flows through the diode 12 via terminal b of the F relay 10 and keeps that relay energized. Because the relay 11 is not energized, current on the conductor 9 flows through contact terminal a of the R relay 11 and actuates the relay 22, thereby connecting the conductor 15 to contact terminal b of the relay 22. This activates the alarm 25.

In sum, if the shift switch 3 is shifted to the R position, the second solenoid 7 is not actuated due to the open state of contact terminal a of the relay 22. Accordingly, shifting the gear to the reverse mode is precluded. Meanwhile, the electric current supplied to terminal b of the relay 22 from the conductor 15 actuates the buzzer 25 and alarms the operator, thus informing the operator of the status of the shift control apparatus. Moreover, since the F relay 10 is electrically latched in its actuated state by the signal on the conductor 9, the relay 21 remains de-energized and the conductive path between the conductor 14 and the solenoid 5 is maintained. Therefore, if the shift switch 3 is shifted out of the F position and then returned again to the F position, the first solenoid 5 is first de-energized and then immediately energized again. This operation is similar to that of the first embodiment.

If, instead, the reverse gear R were selected initially, then the states of the first and second solenoids 5, 7, the relays 21, 22 and the F and R relays 10, 11 will be reversed. Thus, the relay 10 will be de-energized and the relay 11 will be energized, resulting in the relay 21 being energized and relay 22 being de-energized when the vehicle speed is over the threshold value. This precludes actuation of the forward drive solenoid 5, but allows the reverse drive solenoid to be actuated, de-actuated and re-actuated without bringing the vehicle to a speed below the threshold value. At the same time, the vehicle cannot be placed into the F drive mode because the relay 11 is activated and its normally closed contacts are held open by continued energization of the coil of the relay 21 due to the current signal on the conductor 9.

Since the buzzer informs the operator of the operation of the shift control apparatus, the vehicle may be appropriately operated immediately. However, a warning lamp or other types of indicators may be used instead of the buzzer in order to call the operator's attention to the state of the shift control apparatus and the inability to change direction of the drive mechanism at the current vehicle speed.

According to the present invention described above, the gear is shifted to the mode corresponding to the moving direction even if the shift lever is shifted to the neutral position or the opposite position relative to the moving direction during times when the vehicle exceeds the predetermined value of speed. Thereby, engine braking remains operative, and acceleration in the originally selected direction of motion can be invoked without decreasing the speed of the vehicle in order to reset the shift control apparatus.

Although the invention has been described with reference to representative embodiments thereof, such embodiments are illustrative only, and the invention is not restricted or otherwise limited to the details given herein, but may be modified within the scope of the appended claims. For example, the disclosed embodiments have been described as implementing specific types of switch devices, i.e., single-pole and double-pole relays. However, those skilled in the art may find other types of switching devices (such as solid-state switches) preferable or desirable in certain implementations. Also, the shift selector switch can take a number of forms and itself may be electronic rather than electromechanical. Moreover, the switched states of the relays could be readily exchanged without altering the operative nature of the invention.

What is claimed is:

1. A shift control apparatus for a vehicle having a drive mechanism, the apparatus comprising:
   a first solenoid operative to enable the drive mechanism for forward vehicle motion;
   a second solenoid operative to enable the drive mechanism for reverse vehicle motion;
   a shift switch operative to selectively supply electric current to forward and reverse output terminals thereof when forward and reverse vehicle directions, respectively, are selected;
   a first control switch operative between first and second switched states to electrically couple and decouple, respectively, the first solenoid and the forward output terminal of the shift switch;
   a second control switch operative between first and second switched states to electrically couple and decouple, respectively, the second solenoid and the reverse output terminal of the shift switch;
   a switch control circuit operative to control the respective states of the first and second control switches so that the respective forward and reverse output terminals of the shift switch can at all times be coupled to only one of the first and second solenoids but not the other of said solenoids until and unless the speed of the vehicle is less than a threshold value.

2. The shift control apparatus of claim 1, wherein:
   the switch control circuit includes a pair of switches each connected to control a respective one of the first and second control switches, said pair of switches being operative to preclude either of said first and second control switches from coupling a solenoid, which is then not coupled to an output terminal of the shift switch, to a respective output terminal of the shift switch except when the vehicle speed is less than a threshold value.

3. The shift control apparatus of claim 2, wherein:
   at least one of the pair of switches is maintained in one of alternate switched states whenever the vehicle speed exceeds a threshold value, whereby the state of the first and second control switches cannot be altered until the vehicle speed is below a threshold value.

4. The shift control apparatus of claim 3, wherein:
   said pair of switches is connected to actuate one of said first and second control switches and to de-actuate the other of said first and second control switches upon selection of one of said forward and reverse drive modes during times when the vehicle speed exceeds the threshold value, whereby only the previously actuated solenoid can be re-actuated if a drive mode is de-selected and then re-selected while the vehicle speed exceeds the threshold value.

5. The shift control apparatus of claim 3, wherein:
   the pair of switches comprises a pair of relays of which the switch contacts are connected so as to maintain the first and second control switches in mutually opposite switched states, whereby one of the solenoids cannot be actuated once the other of the solenoids has been actuated and the vehicle speed exceeds the threshold value.

6. The shift control apparatus of claim 5, wherein:
   each of the pair of relays is initially responsive to the selection of a respective drive direction by the shift switch and having switchable contacts for actuating a respective one of the first and second control switches when in a predetermined switched state,
   said predetermined switched state causing one of the first and second control switches to interrupt the connection between an output terminal of the shift switch and its respective drive solenoid while maintaining the connection between another output terminal of the shift switch and its respective drive solenoid.

7. A shift control apparatus for a vehicle having a drive mechanism, the apparatus comprising:
   a first solenoid for controlling the drive mechanism in a forward mode;
   a second solenoid for controlling the drive mechanism in a reverse mode;
   a first switch for supplying the first solenoid with an electric current, the first switch being connected to the first solenoid;
   a second switch for supplying the second solenoid with the electric current, the second switch being connected to the second solenoid;
   a shift switch for selectively supplying the first switch and the second switch with the electric current;
   a controller for actuating and de-actuating the first switch and the second switch based on a speed of the vehicle; and wherein the first switch and the second switch are closed when the speed of the vehicle is lower than a predetermined value, and one of the first and second switches corresponding to the selected shift mode is closed and the other switch is open when the speed of the vehicle exceeds the predetermined value.

8. The shift control apparatus for the vehicle according to claim 7, further comprising:

a warning device;

wherein at least one of the first and second switches is connected to actuate the warning device when said switch is open.

9. The shift control apparatus for the vehicle according to claim 8, wherein the warning device is a warning lamp.

10. The shift control apparatus for the vehicle according to claim 8, wherein the warning device is an alarm buzzer.

11. A method of electrically controlling a shift control apparatus for a vehicle having an operable in selectable forward and reverse direction modes, drive mechanism, the method comprising the steps of:

activating the drive mechanism of the vehicle in the selected reverse or forward drive modes when the speed of the vehicle is lower than a threshold value; and inactivating the selected drive mode when the speed of the vehicle exceeds the threshold value and the selected drive mode is different than a previously selected drive mode.

12. The method of controlling the shift control apparatus for the vehicle according to claim 11, further comprising the step of:

activating an alarm when the selected drive mode is different than a previously selected drive mode and the speed of the vehicle exceeds said threshold value.

* * * * *